United States Patent
Dunn

[11] Patent Number: 6,020,716
[45] Date of Patent: Feb. 1, 2000

[54] ENGINE STARTING APPARATUS

[76] Inventor: James P. Dunn, 60 Prescott St., Worchester, Mass. 01605

[21] Appl. No.: 09/206,795

[22] Filed: Dec. 7, 1998

Related U.S. Application Data

[60] Provisional application No. 60/103,683, Oct. 8, 1998.

[51] Int. Cl.$^7$ ........................................................ H02J 7/00
[52] U.S. Cl. .......................................... 320/105; 320/104
[58] Field of Search .................................. 320/103, 104, 320/105, 107

[56] References Cited

U.S. PATENT DOCUMENTS 4,969,834  11/1990  Johnson .................................. 320/165
5,793,185   8/1998  Prelec et al. ........................... 320/105

Primary Examiner—Peter S. Wong
Assistant Examiner—Lawrence Luk
Attorney, Agent, or Firm—Robert D. Fish

[57] ABSTRACT

An emergency engine starting apparatus locates the batteries or other power source(s) with respect to a current carrying cable to provide high conformability between extended and storage configurations. High conformability of an apparatus is defined herein as being configurable between a greatest extended configuration having a length ($l_e$) and a storage configuration having a length ($l_s$), wherein $l_e \geq 3\, l_s$. Preferred apparatus have conformability ratios of $\geq 3$, $\geq 4$, $\geq 5$, $\geq 7.5$, and $\geq 10$. Preferred power sources provide an electrical potential of at least 6 volts, and a current of at least 20 amps. More preferable power sources provide sustainable currents of at least 40 amps, and even more preferable power sources provide sustainable currents of at least 60 amps. Preferred cables are relatively long, measuring up to 6 feet or more.

14 Claims, 3 Drawing Sheets

ENGINE STARTING APPARATUS

This application claims the benefit of U.S. Provisional Application No. 60/103,683, Oct. 8, 1999 incorporated herein by reference in its entirety.

FIELD OF THE INVENTION

The field of the invention is starting cables, such as may be employed to start a dead battery in an automobile.

BACKGROUND OF THE INVENTION

One of the most unpleasant, but seemingly almost unavoidable mishaps in using a motor vehicle is that there is insufficient electrical power left in the rechargeable battery to start up the engine. Such eventualities may be caused by lack of attention of the operator, age of the battery, failure of the charging system, ambient conditions, or numerous other factors. The problem is particularly pervasive in cold climates, and affects literally thousands of engine starting applications, particularly in recreational or seasonal use devices.

Similar problems also affect devices other than motor vehicles. For example, emergency generators are often battery started, and cannot be conveniently started when the battery is dead.

Inability to start an engine can have relatively high costs. For example, pilots frequently fly into airports or remote grass strips where no auxiliary power is available, and sometimes become stranded if the on-board battery fails. Boaters also find themselves caught with dead batteries in locations where it may be impossible to easily "jump start" their engines. Automobile motorists also often become stranded with dead batteries in their vehicles, often at very inconvenient times and locations.

There are basically three classes of devices available for emergency starting of automobiles, airplanes, boats, generators and other apparatus using internal combustion engines. Unfortunately, all such devices tend to be quite cumbersome to use.

Perhaps the most widely used class of emergency starting apparatus is characterized by simple jumper cables. Jumper cables typically comprise two shielded wires, about 6 to 10 feet long, which are capable of carrying upwards of 200 Amps for short periods of time. Clamps or clips are generally connected to the ends of the wires to aid in securing electrical contact with battery terminals and "ground" points on the apparatus being started. Known jumper cables are advantageous in being relatively inexpensive and readily configurable for convenient storage, but they suffer from several disadvantages as well. Among other things, jumper cables require an outside power source, such as the battery of a running automobile or other vehicle, to provide the energy transmitted to the battery being jumped. That requirement is of critical importance when another vehicle is unavailable, and also when another vehicle is available, but cannot be positioned close enough for the jumper cables to connect the respective batteries. Still further, jumper cables are problematic, and even dangerous, in requiring the proper connection of four connectors. Improper connection can result in dangerous sparks or even explosions.

Another class of emergency starting apparatus is characterized by start carts. These are wheeled vehicles containing a large capacity battery, or bank of batteries, electrically coupled to high capacity electrically conducting cables. Depending on the anticipated usage, the cables may have either general-purpose clamps or specialized endmounted connectors. Small start carts mounted on hand truck frames are familiar features in used and new automobile car dealerships, while larger, motor vehicle sized start carts are commonly used in airports to start airplanes. The batteries in start carts are generally recharged using line current at a recharging station, although they may also not carry their own recharging power source. Major advantages of start carts are their mobility and relatively high electrical storage capacity. A major disadvantage, however, is that start carts are inherently too bulky and heavy to be generally carried about in motor vehicles.

A third class of emergency starting apparatus is characterized by trickle or other battery chargers. Known chargers are typically small devices measuring only a few inches in each dimension, and are therefore quite portable. Unfortunately, they require an outside power source such as line current from a standard household electrical outlet plug. Known chargers also typically have relatively low charging rates, and therefore require several hours to recharge a battery with sufficient energy to be used in starting a motor.

Thus, there is a continuing need to provide methods and apparatus that supply electrical power for starting engines.

SUMMARY OF THE INVENTION

Methods and apparatus are provided for emergency starting of engines, especially internal combustion engines, in which the size and location of the power supply with respect to the cable produces high conformability between extended and storage configurations. High conformability of an apparatus is defined herein as being configurable between a greatest extended configuration having a length ($l_e$) and a storage configuration having a length ($l_s$), wherein $l_e \geq 3\, l_s$.

Preferred apparatus have conformability ratios of $\geq 3$, $\geq 4$, $\geq 5$, $\geq 7.5$, and $\geq 10$. Preferred power sources provide an electrical potential of at least 6 volts, and a current of at least 20 amps. More preferable power sources provide sustainable currents of at least 40 amps, and even more preferable power sources provide sustainable currents of at least 60 amps. Preferred cables are relatively long, measuring up to 6 feet or more.

BRIEF DESCRIPTION OF THE DRAWINGS

Various objects, features, aspects and advantages of the present invention will become more apparent from the following detailed description of preferred embodiments of the invention, along with the accompanying drawings in which like numerals represent like components.

DETAILED DESCRIPTION

Figure 1:
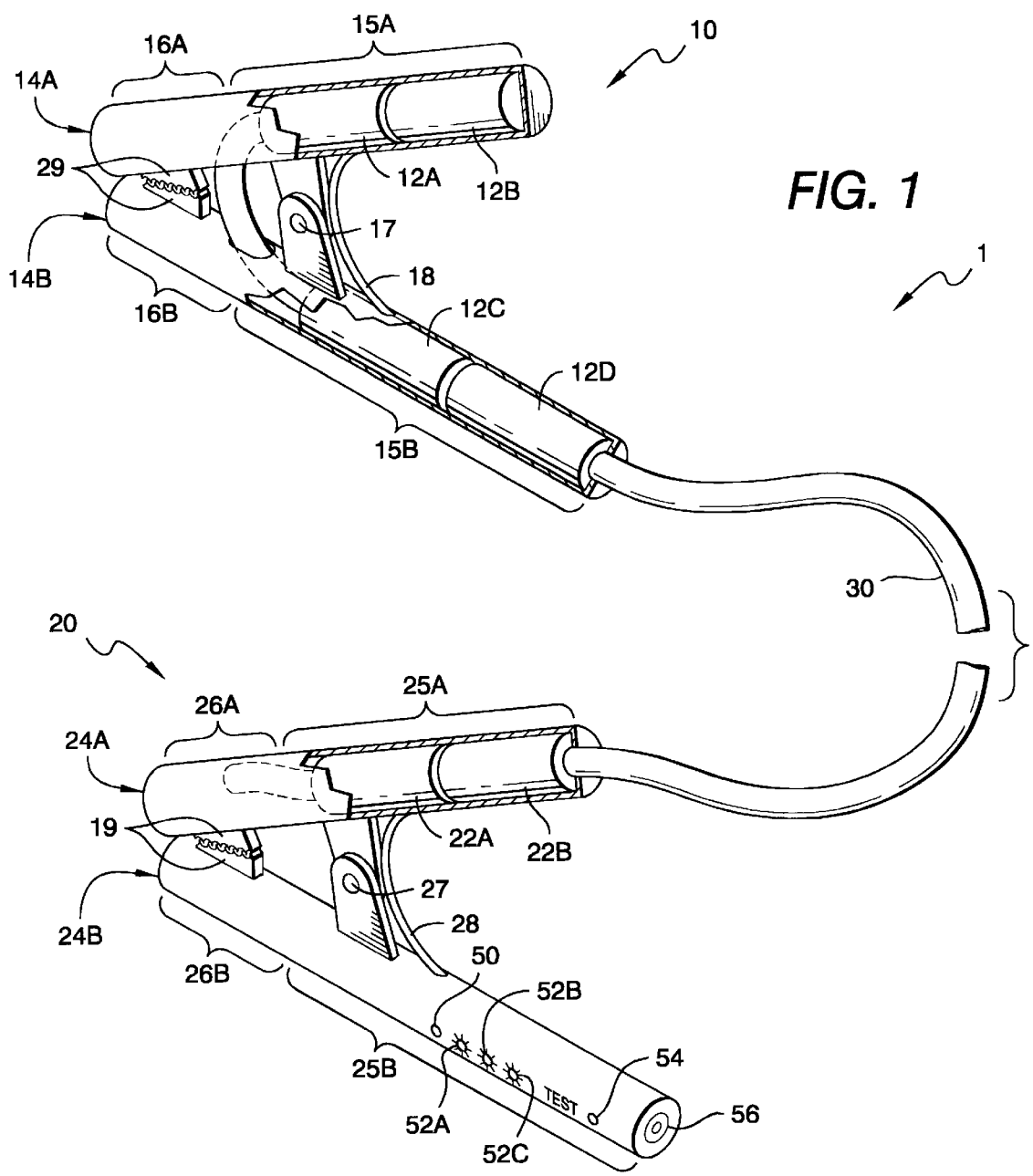
FIG. 1 is a partial cutaway plan view of an engine starting apparatus according to the invention.
Figure 2:
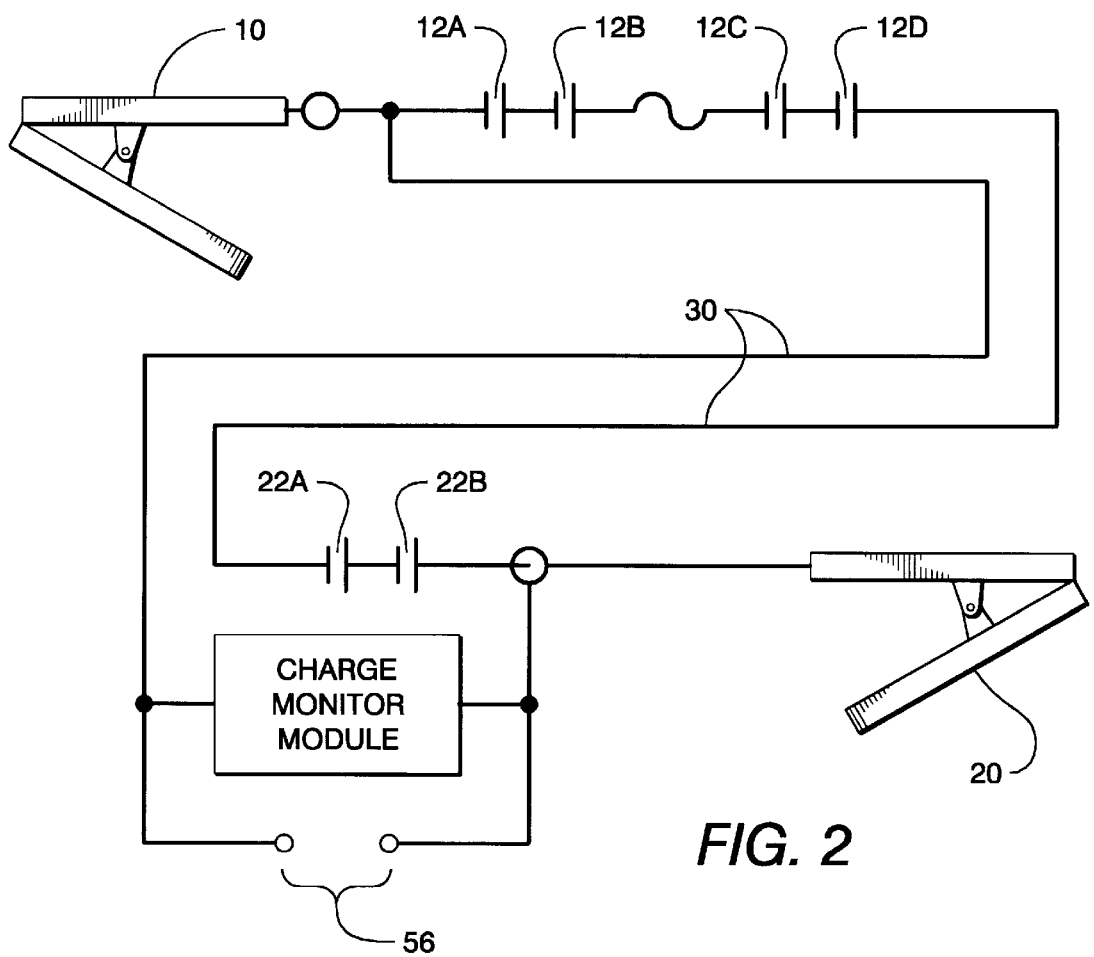
FIG. 2 is an electrical schematic of the device of claim 1.

In FIG. 1 an engine starting apparatus 1 generally includes two clamps 10, 20 electrically coupled by a cable 30. Clamp 10 contains batteries 12A, 12B, 12C and 12D, and clamp 20 contains batteries 22A and 22B, as well as a charging circuit 50.

Turning in greater detail to individual components, clamps 10, 20 may advantageously have a similar appearance and operation to ordinary clamps used on previously known jumper cables. Clamp 10, for example, generally comprises two elongated members 14A and 14B, each of which has a handle portion 15A, 15B and a nose portion 16A, 16B. The members 14A, 14B are coupled at pivot 17, and are biased into a clamped position as shown in FIG. 1 with a spring or other biasing means 18. Opposing gripping members 19 are positioned at the nose portions 16A, 16B. Clamp 20 contains corresponding parts: elongated members 24A and 24B; handle portions 25A, 25B; nose portions 26A, 26B; pivot 27; biasing means 28; and opposing gripping members 29.

Batteries 12A–12D, 22A–22B are preferably compact, ultra high power batteries, and preferably include spiral wound, Thin Metal Film (TMF), 2.0 V, 1 AH cells available from Bolder™. Since most automobiles employ a nominal 12 V circuit, the apparatus 1 may advantageously contain 6 such batteries electrically coupled in series. Alternative apparatus may employ other configurations of batteries to accommodate other starting environments, especially 6 V, 24 V, 28 V and 36 V environments. It is further contemplated that a single apparatus could be configured with appropriate switches or other components that permit a user to provide different nominal voltages from the same apparatus.

Batteries employed in contemplated devices are expected to deliver relatively high currents. For automobile starting purposes the batteries should be able to deliver from about 20 A to about 60 A. For other purposes, such as starting motorcycle engines, lesser currents such as 10 A or even 5 A may be acceptable. For other purposes, such as starting airplane engines, large currents of 70 A or even 80 A or more are contemplated. These current values are defined herein to be sustained currents over a period of least 3 seconds, rather than current spikes.

It is still further contemplated to use other power sources in place of or in addition to batteries. For example, ultra capacitors could be employed, which may have the added advantage of an expected lifetime (500,000 uses) greater than that of other components. Thus, unless the context indicates otherwise, it should be understood that use herein of the terms "battery" or "batteries" are intended to convey the broader scope of "power source" and "power sources", respectively.

Inclusion of batteries 12A–12D, 22A–22B within the clamps 10, 20 is thought to be particularly advantageous because it allows the entire apparatus 1 to be folded up, or otherwise configured in a compact fashion. Highly configurable apparatus can thus be conveniently stored in an automotive trunk, under an automotive seat, stuffed into a crevice, or even conveniently carried in a pouch. Thus, the size and disposition of the power supply is contemplated to be an important factor in producing high conformability between extended and storage configurations.

The concept of configurability can be addressed in many ways. For example, configurability may be considered to relate the greatest length to which an object can be extended in an extended configuration, against the greatest dimension of the same object in a storage configuration. This can be readily appreciated by considering specific examples. A typical start cart employed in jump-starting automobiles at an automotive car lot is on the order of about four feet tall, 18 inches wide, and about 12 inches deep. There are generally two 3 or 4 foot cables, each coupled to one of the terminals of the battery or batteries, and in an extended configuration the overall length (i.e., the longest dimension) from the tip of one cable to the tip of the other cable is about 7 to 9 feet. The storage configuration, however, has a length corresponding to the height of the cart, namely about 4 feet. Thus, the ratio of longest dimension in the extended configuration to longest dimension in the storage configuration is about 1.75:1 or 2.25:1.

In a preferred embodiment according to FIG. 1, the greatest extendable length is about 36", but the apparatus can be coiled into a storage configuration having a greatest length of no more than about 10 inches. This provides a ratio of greatest extended configuration ($l_e$) to greatest length in storage configuration ($l_s$) of more than 3. Other contemplated high conformability ratios are at least 3.5, at least 4, at least 5, at least 7.5 and at least 10, all of which can be achieved using the principles disclosed herein. The 10 ratio, for example, may be achieved using a relatively long and thin cable of 10 feet or more, and coiling the cable around the connectors so that the entire storage configuration is no more than one foot in any dimension (i.e., length, width or height).

Figure 3A:
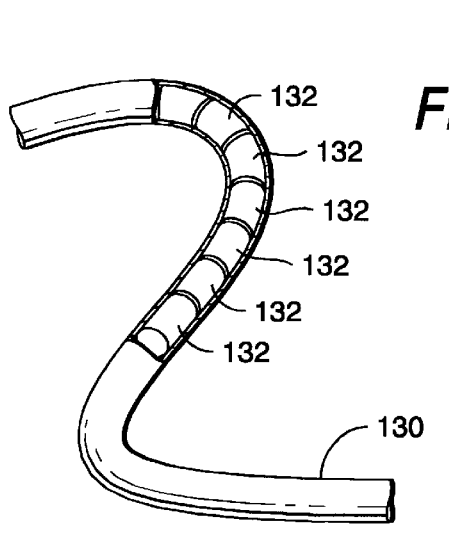
FIGS. 3A, 3B, 3C, 3D, and 3E are schematic representations of alternative configurations of cable/battery configurations.
Figure 3B:
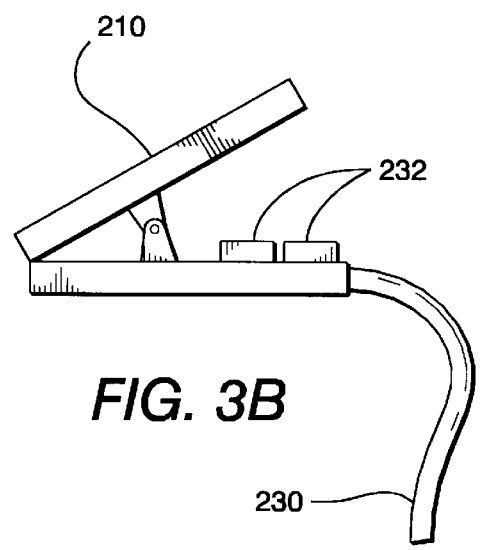
Figure 3C:
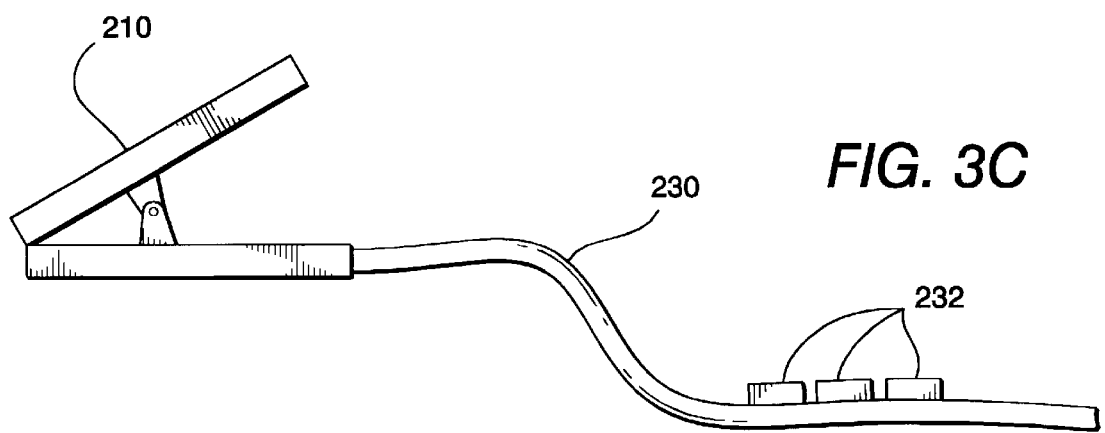
Figure 3D:
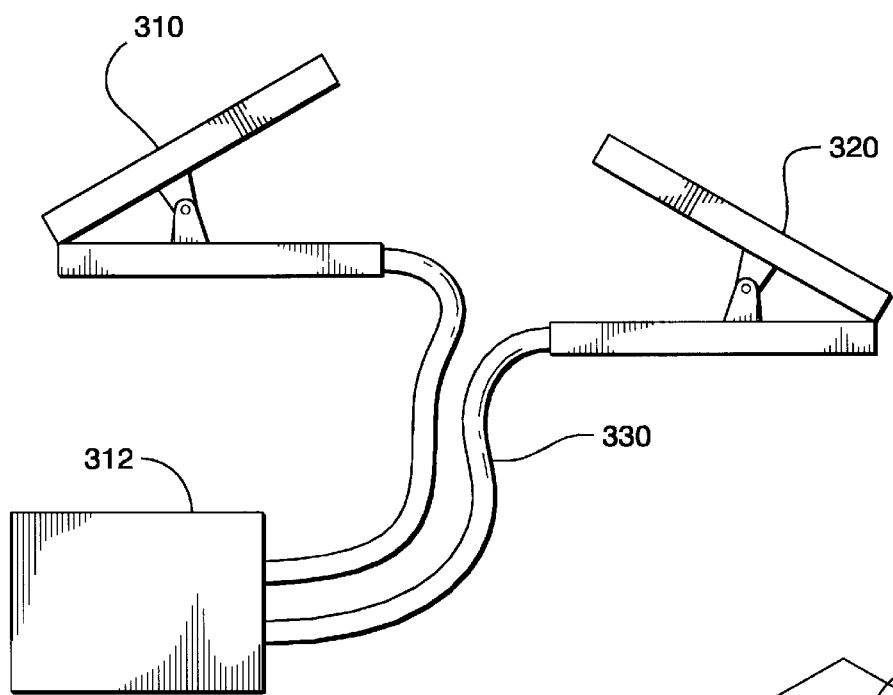
Figure 3E:
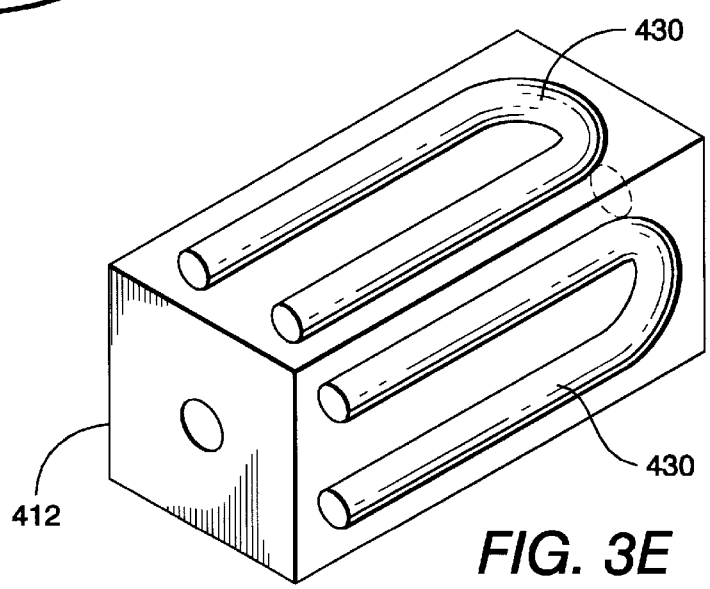

The high conformability of apparatus contemplated herein is not dependent upon the batteries being disposed in the clamps. Among the many alternative embodiments, one or more of the batteries could be placed in line with the cable 130, so that for some section the cable itself consists of interconnected batteries 132 (see FIG. 3A). In other embodiments, some or all of the batteries 232 could surround or otherwise juxtapose one or more of the clamps 210 (see FIG. 3B) or cable 230 (see FIG. 3C). In still other embodiments one or more of the batteries could extend to the cable 330 from a power supply box 312 (see FIG. 3D) or cables 430 could be removable attached to box 412 (FIG. 3E).

Cable 30 is contemplated to comprise any suitable current carrying conductor, including wires, packed powders or other compositions, jointed bars, and so forth. Wire cables, including solid, twisted, or braid wires, are most preferred due to their relatively low cost and relatively high reliability. The conductive material is likewise contemplated to be any suitable material, including copper, aluminum, alloys, graphites, and so forth. It is preferred that the conductive material be insulated, and suitable insulation material such as rubber and plastic are known.

Cables may be provided in any number of different lengths. Contemplated cables may measure as little at 8 inches or less (measured from the connection points of opposite clamps) to as much as 36 inches or more. Exemplary cables measure at least 10", 12", 15", –20", 24" 25", 30" and 36". Particularly long cables are contemplated to measure at least 5 feet, or even 10 feet in extended configurations.

In a particularly preferred class of embodiments the cable is at least 24 inches in length, and the power source provides a current of at least 40 amps across the at least two connectors. In another particularly preferred class of embodiments the cable is at least 24 inches in length, and the power source provides a current of at least 60 amps across the at least two connectors. In other particularly preferred classes of embodiments the cable is at least 48 inches and 60 inches in length, respectively, and the power source provides a current of at least 60 amps across the at least two connectors.

In FIG. 1 charging circuit 50 is fitted within the handle portion 25B of clamp 20. As shown, the charging circuit 50 may advantageously include indicator lamps 52A, 52B, and 52C, a test button 54, and an external power jack 56.

Thus, improved engine starting apparatus have been disclosed. Such apparatus can be made to start virtually any vehicle or aircraft, or other internal combustion engine, including diesels and industrial engines on stationary apparatus like emergency pumps, generators, farm machinery, etc. Despite having very large capacity, these apparatus will often be are more convenient than other devices to use, and will generally be more convenient to store, due to their high conformability. Such apparatus may be referred to as "autonomous start cables" or "Hot Wires™".

The following claims are provided in the hope that they will add additional clarity to this disclosure. Inclusion of the claims is not intended to imply that a search of the prior art has been performed or that the claims do not read on the prior art. Moreover, the claims should not be interpreted as defining the scope of any invention disclosed herein. Thus future applications claim priority to this application may or may not include the following claims, and may include claims broader, narrower, or entirely different from the following claims.

We claim:

1. An emergency engine starting apparatus comprising:
   an electrically conducting cable having at least two connectors;
   a power source providing an electrical potential of at least 6 volts and a current of at least 20 amps across the at least two connectors; and
   the apparatus configurable between a first configuration in which the apparatus has a length and a second configuration in which the apparatus has a length, wherein $l_e \geq 3 \, l_s$, and the length of the apparatus is equal to the greatest distance between any two points on the apparatus.

2. The device of claim 1 wherein the cable comprises a wire.

3. The device of claim 1 wherein the cable comprises a metallic wire.

4. The device of claim 1 wherein the power source comprises a battery.

5. The device of claim 1 wherein the power source detaches from the cable in configuring the device in the second configuration.

6. The device of claim 1 wherein the cable is at least 8 inches in length.

7. The device of claim 1 wherein the cable is at least 24 inches in length.

8. The device of claim 1 wherein the cable is at least 36 inches in length.

9. The device of claim 1 wherein the cable is at least 24 inches in length, and the power source provides a current of at least 40 amps across the at least two connectors.

10. The device of claim 1 wherein the cable is at least 24 inches in length, and the power source provides a current of at least 60 amps across the at least two connectors.

11. The device of any of claims 1–10 wherein $l_e \geq 4 \, l_s$.

12. The device of any of claims 1–10 wherein $l_e \geq 5 \, l_s$.

13. The device of any of claims 1–10 wherein $l_e \geq 7.5 \, l_s$.

14. The device of any of claims 1–10 wherein $l_e \geq 10 \, l_s$.

* * * * *